(12) United States Patent
Santinon

(10) Patent No.: US 8,029,667 B2
(45) Date of Patent: Oct. 4, 2011

(54) FILLER AND FILTER UNIT FOR A TANK, IN PARTICULAR FOR THE FUEL OF A MOTOR VEHICLE FITTED WITH A DIESEL ENGINE

(75) Inventor: Alvise Santinon, Turin (IT)

(73) Assignee: Rototech S.r.L., San Gillio (IT)

( * ) Notice: Subject to any disclaimer, the term of this patent is extended or adjusted under 35 U.S.C. 154(b) by 81 days.

(21) Appl. No.: 12/700,180

(22) Filed: Feb. 4, 2010

(65) Prior Publication Data

US 2011/0036763 A1    Feb. 17, 2011

(30) Foreign Application Priority Data

Feb. 9, 2009   (IT) .................................. TO09U0013

(51) Int. Cl.
  *B01D 35/02*    (2006.01)
(52) U.S. Cl. ..................... 210/172.6; 210/232; 210/236; 210/251; 210/474; 210/475
(58) Field of Classification Search ......................... None
  See application file for complete search history.

(56) References Cited

U.S. PATENT DOCUMENTS

| | | | | |
|---|---|---|---|---|
| 1,055,744 A * | 3/1913 | Hans | ............................. | 210/305 |
| 1,155,070 A * | 9/1915 | Kessler | ........................ | 220/86.2 |
| 1,177,277 A * | 3/1916 | Schaub | ...................... | 210/172.6 |
| 1,192,134 A * | 7/1916 | Stevens | .......................... | 73/306 |
| 1,217,732 A * | 2/1917 | Fedders | ......................... | 165/148 |
| 1,415,217 A * | 5/1922 | Brock | ........................ | 210/172.6 |
| 1,427,619 A * | 8/1922 | Mueller | ........................ | 210/349 |
| 1,436,294 A * | 11/1922 | Scott | ............................. | 210/473 |
| 1,451,136 A * | 4/1923 | Allnutt | ........................ | 220/86.1 |
| 1,553,395 A * | 9/1925 | Ressler et al. | ............... | 220/86.1 |
| 1,570,461 A * | 1/1926 | Cohn | ........................... | 220/88.2 |
| 1,581,947 A * | 4/1926 | Hobbs | ........................... | 210/473 |
| 1,596,362 A * | 8/1926 | McDonald | ................... | 210/305 |
| 1,604,048 A * | 10/1926 | Hobbs | ........................... | 210/305 |
| 1,665,494 A * | 4/1928 | Dillon | .......................... | 210/312 |
| RE16,994 E * | 6/1928 | Cohn | ........................... | 220/86.3 |
| 1,677,118 A * | 7/1928 | Ford | ............................. | 210/457 |
| 1,693,741 A * | 12/1928 | Wuest | .......................... | 210/448 |
| 1,711,093 A * | 4/1929 | Helman | ...................... | 210/314 |
| 1,757,285 A * | 5/1930 | Anschicks | ................... | 220/86.1 |
| 1,814,656 A * | 7/1931 | Anschicks | ................... | 220/86.1 |
| 1,835,429 A * | 12/1931 | Rice et al. | .................... | 210/445 |
| 1,862,815 A * | 6/1932 | Buddenbrock | ............. | 220/86.2 |
| 1,953,669 A * | 4/1934 | Bettes | ............................. | 73/294 |

(Continued)

*Primary Examiner* — Robert James Popovics
(74) *Attorney, Agent, or Firm* — Sughrue Mion, PLLC

(57) ABSTRACT

The unit comprises a tubular filler, provided with an internal thread) suitable for coupling with a corresponding external thread of the mouthpiece of the tank, and with, internally, a plurality of essentially coplanar anchoring prominences which, in the fitted condition, rest on part of the top edge of the mouthpiece of the tank to which they are constrained by fixing elements in such a way as to prevent the unscrewing of the filler. The anchoring prominences have respective retention elements protruding radially towards the centerline of the filler and capable of being opened out elastically towards the outside. The unit also comprises a filter with, at the top, an annular flange protruding radially towards the outside. It is possible to introduce this filter through the filler prefitted on the tank until the said flange interferes with the retention elements of the prominences of the filler and, after passing beyond the said retention elements, is held between them and the top edge of the mouthpiece of the tank.

2 Claims, 3 Drawing Sheets

U.S. PATENT DOCUMENTS

| | | | | |
|---|---|---|---|---|
| 1,976,975 A * | 10/1934 | Williams | | 220/86.2 |
| 2,010,445 A * | 8/1935 | Sparks | | 220/86.2 |
| 2,145,759 A * | 1/1939 | Fellows et al. | | 220/86.3 |
| 2,172,031 A * | 9/1939 | Norman | | 210/472 |
| 2,288,532 A * | 6/1942 | Knapp | | 210/474 |
| 2,351,526 A * | 6/1944 | Lebus | | 220/203.26 |
| 2,356,327 A * | 8/1944 | Lebus | | 220/203.26 |
| 2,379,735 A * | 7/1945 | Meikle | | 220/88.2 |
| 2,466,076 A * | 4/1949 | Bentley et al. | | 220/86.2 |
| 2,524,313 A * | 10/1950 | Gerling | | 210/453 |
| 2,733,775 A * | 2/1956 | Depure | | 210/348 |
| 2,761,529 A * | 9/1956 | Wisenbaugh | | 303/31 |
| 3,016,161 A * | 1/1962 | Peplin | | 220/86.2 |
| 3,322,282 A * | 5/1967 | Lyman | | 210/137 |
| 3,749,248 A * | 7/1973 | Dickinson | | 210/238 |
| 3,749,250 A * | 7/1973 | Oldford | | 210/448 |
| 3,750,889 A * | 8/1973 | Acosta | | 210/497.01 |
| 3,905,505 A * | 9/1975 | Gallay | | 220/563 |
| 3,951,297 A * | 4/1976 | Martin | | 220/86.3 |
| 4,033,872 A * | 7/1977 | Mori | | 210/167.04 |
| 4,130,622 A * | 12/1978 | Pawlak | | 264/255 |
| 4,224,167 A * | 9/1980 | Buttigieg | | 210/460 |
| 4,248,279 A * | 2/1981 | Warmbold | | 141/348 |
| 4,259,184 A * | 3/1981 | D'Arnal | | 210/85 |
| 4,265,752 A * | 5/1981 | O'Banion | | 210/172.6 |
| 4,326,641 A * | 4/1982 | Wilken | | 220/86.3 |
| 4,397,745 A * | 8/1983 | Troller | | 210/237 |
| 4,495,073 A * | 1/1985 | Beimgraben | | 210/448 |
| 4,640,771 A * | 2/1987 | Whalen et al. | | 210/167.01 |
| 4,851,118 A * | 7/1989 | Kurihara | | 210/315 |
| 4,860,805 A * | 8/1989 | Townsend | | 141/382 |
| 4,861,478 A * | 8/1989 | Hall | | 210/416.4 |
| 4,908,130 A * | 3/1990 | Lynne | | 210/172.6 |
| 5,025,946 A * | 6/1991 | Butkovich et al. | | 220/86.3 |
| 5,312,545 A * | 5/1994 | Starin et al. | | 210/172.6 |
| 5,492,143 A * | 2/1996 | Cooper et al. | | 137/15.01 |
| 5,505,849 A * | 4/1996 | Rama, Jr. | | 210/232 |
| 5,520,802 A * | 5/1996 | Brubaker | | 210/172.6 |
| 5,897,787 A * | 4/1999 | Keller | | 210/767 |
| 6,105,787 A * | 8/2000 | Malkin | | 210/457 |
| 6,279,751 B1 * | 8/2001 | Malkin | | 210/457 |
| 6,858,134 B2 * | 2/2005 | Yates | | 210/167.01 |
| D518,871 S * | 4/2006 | Gillette et al. | | D23/209 |
| 7,302,968 B2 * | 12/2007 | Stuart | | 137/592 |
| 7,429,322 B2 * | 9/2008 | Fujita et al. | | 210/172.4 |
| 7,491,328 B2 * | 2/2009 | Brodbeck et al. | | 210/232 |
| 7,757,729 B2 * | 7/2010 | Smith et al. | | 141/206 |
| 7,785,516 B2 * | 8/2010 | Malkin | | 264/271.1 |
| 7,837,875 B2 * | 11/2010 | Callaert et al. | | 210/232 |
| 7,875,178 B2 * | 1/2011 | Ashliman | | 210/323.1 |
| D637,698 S * | 5/2011 | Greene | | D23/268 |
| 2005/0109685 A1* | 5/2005 | Fujita et al. | | 210/172 |
| 2011/0036763 A1* | 2/2011 | Santinon | | 210/232 |

* cited by examiner

FILLER AND FILTER UNIT FOR A TANK, IN PARTICULAR FOR THE FUEL OF A MOTOR VEHICLE FITTED WITH A DIESEL ENGINE

This invention regards a filler and filter unit for the mouthpiece of a tank, in particular for the fuel tank of a motor vehicle fitted with a Diesel-cycle engine.

One scope of this invention is to realize a filler and filter unit with a simplified structure and which can easily and reliably be assembled on the mouthpiece of a tank.

This and other scopes are realized according to the invention with a unit comprising a tubular filler, provided at the bottom with an internal thread suitable for coupling with a corresponding external thread of the mouthpiece of the tank, and with, internally, a plurality of essentially coplanar anchoring prominences which, in the fitted condition, rest on part of the top edge of the mouthpiece of the tank to which they are constrained by fixing elements in such a way as to prevent the unscrewing of the filler; the said anchoring prominences having respective retention elements protruding radially towards the centreline of the filler and capable of being opened out elastically towards the outside; and a filter with, at the top, an annular flange protruding radially towards the outside; it being possible to introduce the filter through the filler prefitted on the tank until the said flange interferes with the retention elements of the internal prominences of the filler and, after passing beyond the said retention elements, is held between them and the top edge of the mouthpiece of the tank.

Further characteristics and advantages of the invention will appear from the detailed description which follows, which is purely exemplificative and not limitative, with reference to the attached drawings, in which.

Figure 1:
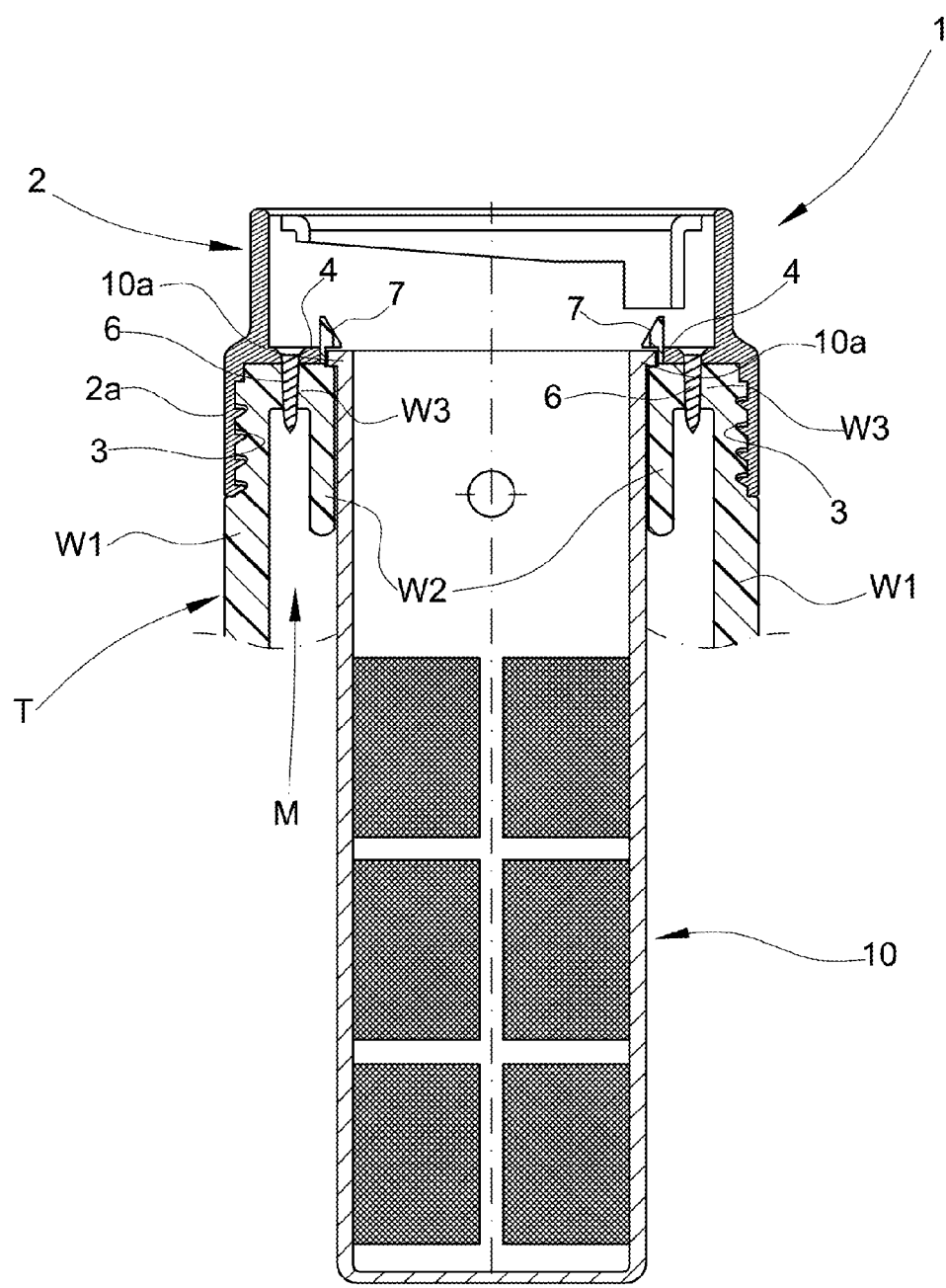
FIG. 1 is a cutaway view which shows a filler and filter unit according to this invention, fitted on the mouthpiece of a tank.
Figure 2:
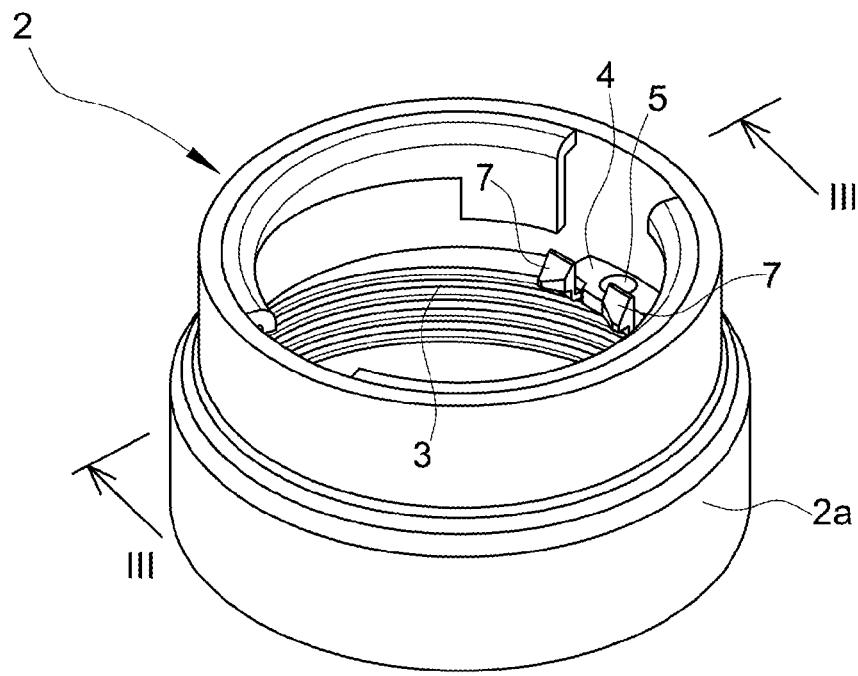
FIG. 2 is a perspective view of the filler in a unit according to the invention.

The letter T in FIG. 1 indicates a tank, and in particular a fuel tank for a motor vehicle fitted with a Diesel-cycle engine.

Of the tank T FIG. 1 only shows the mouthpiece M coupled to which is a filler and filter unit according to the invention, indicated overall by 1.

The tank T can be made, for example, from a plastic material using the rotational moulding technique and has a mouthpiece or tubular mouth M with an outer wall W1 and an internal wall W2, connected to one another by an annular wall or top edge W3.

The unit 1 comprises a tubular filler 2, the bottom axial part 2a of which has an increased diameter and is provided internally with a thread 3 which can be coupled, as can be seen in FIG. 1, with a corresponding external thread on the mouthpiece M of the tank T.

Figure 3:
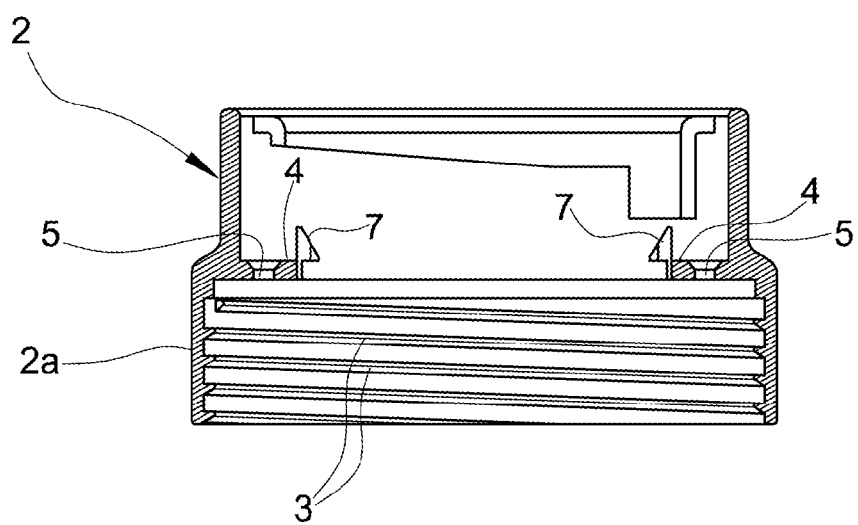
FIG. 3 is a cutaway view along the line III-III of FIG. 2.
Figure 4:
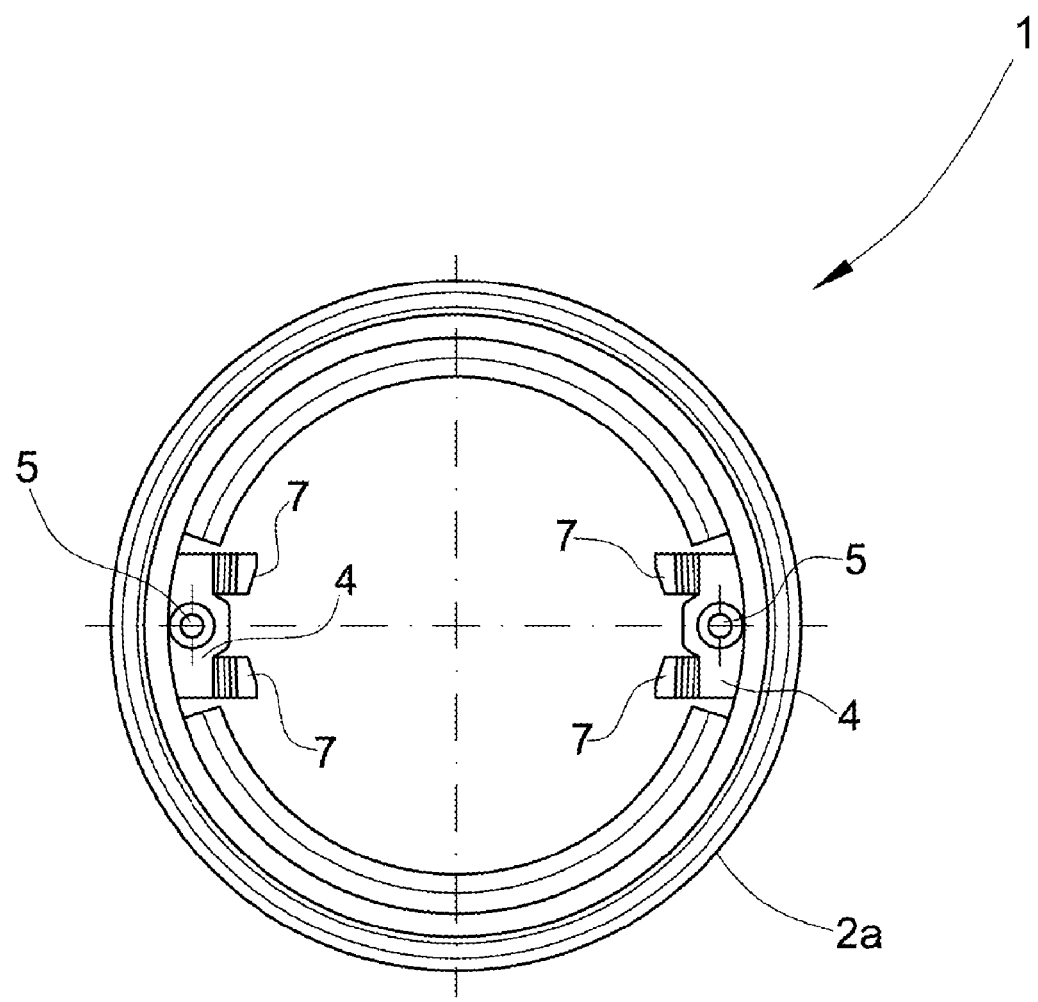
FIG. 4 is a plan view from above of the filler shown in the previous figures.

Extending from the internal surface of the filler 2 is a pair of anchoring prominences 4, coplanar with one another and provided with respective through holes 5 (see FIGS. 3 and 4 in particular).

With reference to FIG. 1, in the fitted condition of the filler 2, its anchoring prominences 4 rest on part of the top edge W3 of the mouthpiece M of the tank T to which they are fixed by fixing elements, such as screws 6 of the self-tapping type, in such a way as to impede the unscrewing of the filler 2 from the mouthpiece of the tank.

The anchoring prominences 4 of the filler 2 have respective pairs of retention elements 7 which protrude radially towards the centreline of the filler 2, and which are capable of being opened out elastically towards the outside.

The filler 2 is conveniently made from a moulded plastic material and the anchoring prominences 4 as well as the associated retention elements 7 are conveniently realized integrally in a single piece with it.

The unit 1 comprises a filter 10 (FIG. 1) of a general type known per se. In the illustrated embodiment, the filter 10 includes a structure with an essentially cylindrical tubular conformation, forming at the top a flange 10a protruding radially towards the outside.

In the fitted condition of the filter 10 (FIG. 1), its flange 10a extends radially in the inside of the anchoring prominences 4 of the filler 2, lying essentially coplanar with them, and rests on the radially innermost part of the wall or top edge W3 of the mouthpiece M of the tank T.

The filter 10 can be introduced through the filler 2, downwards from the top, until the flange 10a of the said filter interferes with the retention elements 7 of the filler and, after passing beyond these retention elements 7, is held firmly between them and the top edge W3 of the mouthpiece of the tank T.

Moreover, once fitted, the filter 10 is still easy to extract from the filler 2 and from the associated tank: for this purpose it is sufficient to open out the retention elements 7, manually or using an appropriate tool, until the flange 10a of the filter can be disengaged from them. The filter can then be raised and extracted for cleaning or replacement operations as required.

Naturally, without prejudice to the principle of the invention, the forms of actuation and the embodiment details can be widely varied compared with what has been described and illustrated for non-limiting exemplificative purposes only, without thereby leaving the framework of the invention as defined in the annexed claims.

What is claimed is:

1. In a fuel tank having a mouthpiece, the improvement comprising:

a filler and filter unit for the mouthpiece of said tank, said unit comprising:

a tubular filler provided at a bottom thereof with an internal thread for threadably engaging a corresponding external thread of said mouthpiece, and having internally, a plurality of essentially coplanar, diametrically opposed, anchoring prominences, said filler in a fitted condition is fixed to said mouthpiece by means of internally located screws thereby preventing the unscrewing of the filler and rests on part of a top edge of said mouthpiece; said anchoring prominences each having respective retention elements protruding radially towards a centerline of said filler and capable of being elastically spread away from each other; and an elongated filter having a top mounted annular flange protruding radially away from said centerline; it being possible to introduce the filter through the filler prefitted on the tank until the said flange engages and spreads the retention elements of the said internal prominences of the filler and, after passing beyond the said retention elements, is held between them and the top edge of the mouthpiece of the tank.

2. In a vehicle having a Diesel-cycle engine and a fuel tank having a mouthpiece, the improvement comprising:

a filler and filter unit for the mouthpiece of said tank, said unit comprising:

a tubular filler provided at a bottom thereof with an internal thread for threadably engaging a corresponding external thread of said mouthpiece, and having internally, a plurality of essentially coplanar, diametrically opposed, anchoring prominences, said filler in a fitted condition is fixed to said mouthpiece by means of internally located screws thereby preventing the unscrewing of the filler and rests on part of a top edge of said mouthpiece; said anchoring prominences each having respective retention elements protruding radially towards a centerline of said filler and capable of being elastically spread away from each other; and an elongated filter having a top mounted annular flange protruding radially away from said centerline; it being possible to introduce the filter through the filler pre-fitted on the tank until the said flange engages and spreads the retention elements of the said internal prominences of the filler and, after passing beyond the said retention elements, is held between them and the top edge of the mouthpiece of the tank.

* * * * *